United States Patent [19]

Yonezawa et al.

[11] 4,129,860

[45] * Dec. 12, 1978

[54] APPARATUS FOR FORMING A CHARACTER BY A MATRIX PATTERN OF PICTURE ELEMENTS

[75] Inventors: Setsuo Yonezawa; Tsuneta Kawakami; Tatsuo Shimada; Yoshinori Chida, all of Tokyo, Japan

[73] Assignee: Kabushiki Kaisha Seikosha, Japan

[*] Notice: The portion of the term of this patent subsequent to Mar. 14, 1995, has been disclaimed.

[21] Appl. No.: 723,291

[22] Filed: Sep. 13, 1976

[30] Foreign Application Priority Data

Sep. 12, 1975 [JP] Japan ................................ 50-110596

[51] Int. Cl.² ............................................. G06F 3/14
[52] U.S. Cl. ................................ 340/324 AD; 178/30; 351/138
[58] Field of Search .................... 340/324 A, 324 AD; 178/15, 30; 358/133, 138

[56] References Cited

U.S. PATENT DOCUMENTS

| 3,678,497 | 7/1972 | Watson et al. | 340/324 AD |
| 3,893,100 | 7/1975 | Stein | 178/30 |
| 3,896,428 | 7/1975 | Williams | 340/324 AD |
| 3,921,164 | 11/1975 | Anderson | 340/324 AD |
| 3,999,168 | 12/1976 | Findley et al. | 178/15 |
| 4,007,442 | 2/1977 | Findley et al. | 178/15 |

Primary Examiner—Marshall M. Curtis
Attorney, Agent, or Firm—Robert E. Burns; Emmanuel J. Lobato; Bruce L. Adams

[57] ABSTRACT

An apparatus for forming a character in which picture elements as indication elements are formed in the shape of a matrix to create a character, such as a letter, a numeral, a symbol or the like, in this case the magnifications of the character in both a longitudinal and a lateral direction are suitably increased or reduced and, in case the character has become obscure as a result of such enlargement, an interpolation is performed to the character to render it clear. The apparatus is used, for example, in the case of forming a character with printer.

8 Claims, 49 Drawing Figures $d_0$

FIG.7
A
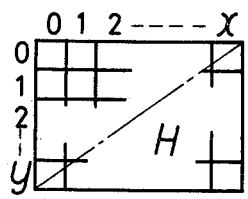
B
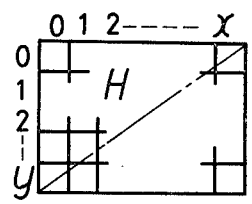
C
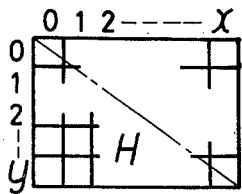
D
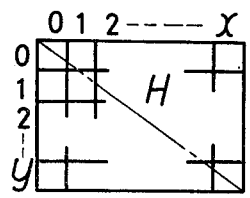

FIG.20

|   | 1 | 2 | 3 | 4 | 5 |
|---|---|---|---|---|---|
| 1 | 1 | 1 | 1 | 1 | 1 |
| 2 | 1 | 0 | 0 | 0 | 1 |
| 3 | 1 | 0 | 0 | 0 | 1 |
| 4 | 1 | 1 | 1 | 1 | 0 |
| 5 | 1 | 0 | 1 | 0 | 0 |
| 6 | 1 | 0 | 0 | 1 | 0 |
| 7 | 1 | 0 | 0 | 0 | 1 |

FIG.21

|       | A | B | C | D | E |
|-------|---|---|---|---|---|
| $M_1$ | 0 | 0 | 0 | 0 | 0 |
| $M_2$ | 0 | 0 | 0 | 0 | 0 |
| $M_3$ | 0 | 0 | 1 | 1 | 1 |
| $M_4$ | 0 | 0 | 1 | 0 | 0 |
| $M_5$ | 0 | 0 | 1 | 0 | 0 |
| $M_6$ | 0 | 0 | 1 | 1 | 1 |
| $M_7$ | 0 | 0 | 1 | 0 | 1 |
| $M_8$ | 0 | 0 | 1 | 0 | 0 |
| $M_9$ | 0 | 0 | 1 | 0 | 0 |

FIG.22

|       | A | B | C | D | E |
|-------|---|---|---|---|---|
| $M_1$ | 0 | 0 | 0 | 0 | 0 |
| $M_2$ | 0 | 0 | 1 | 1 | 1 |
| $M_3$ | 0 | 0 | 1 | 0 | 0 |
| $M_4$ | 0 | 0 | 1 | 0 | 0 |
| $M_5$ | 0 | 0 | 1 | 1 | 1 |
| $M_6$ | 0 | 0 | 1 | 0 | 1 |
| $M_7$ | 0 | 0 | 1 | 0 | 0 |
| $M_8$ | 0 | 0 | 1 | 0 | 0 |
| $M_9$ | 0 | 0 | 0 | 0 | 0 |

| y\x | 0 | 1 | 2 | 3 | 4 | 5 | 6 | 7 |
|---|---|---|---|---|---|---|---|---|
| 0 | 1 | 1 | 1 | 1 | 1 | 1 | 0 | 0 |
| 1 | 1 | 1 | 1 | 1 | 1 | 0 | 0 | 0 |
| 2 | 1 | 1 | 1 | 1 | 0 | 0 | 0 | 0 |
| 3 | 1 | 1 | 1 | 0 | 0 | 0 | 0 | 0 |
| 4 | 1 | 1 | 0 | 0 | 0 | 0 | 0 | 0 |
| 5 | 1 | 0 | 0 | 0 | 0 | 0 | 0 | 0 |
| 6 | 0 | 0 | 0 | 0 | 0 | 0 | 0 | 0 |

APPARATUS FOR FORMING A CHARACTER BY A MATRIX PATTERN OF PICTURE ELEMENTS

BACKGROUND OF THE INVENTION

This invention relates to an apparatus for forming a character, such as a letter, a numeral, a symbol or the like by forming picture elements in the shape of a matrix. More particularly, it is concerned with an apparatus for forming a character in any desired magnification while the figure essentially meant by the character is maintained.

In general, in case of forming a letter, a numeral or a symbol by a dot matrix, if the formed character is of a size within a certain range, reading of the character is seldom impeded; however, when the character is enlarged to a certain size beyond such range, it becomes, in some cases, difficult to read the character. For example, in the case of letters composed of only horizontal and vertical lines such as "E" and "F", their clearness does not greatly lower even after they were similarly enlarged. In contrast, in the case of letters including oblique lines such as "R" and "X", reading of these letters when enlarged becomes very difficult. FIG. 1 shows an example of an enlarged "R", that is, it shows the case where the original dot pattern shown in FIG. 2 has been enlarged twice in a longitudinal direction and also twice in a lateral direction. In this example, however, it is difficult to read the enlarged "R" in an immediate manner.

In such a character formed by dots, the clearness of oblique lines has heretofore been raised by forming a dot for compensation between enlarged dots. In such prior art, however, the size of a character is standardized and compensation in vertical and horizontal directions is not made.

SUMMARY OF THE INVENTION

The present invention overcomes the above-mentioned difficulties and provides a newly improved apparatus for forming a character from a pattern of separate display picture elements.

The present invention is characterized in that, in a character formed by a matrix pattern which is composed of plural picture elements, the magnifications in a longitudinal and a lateral directions of the said pattern is set to any desired value to form a character with a desired enlargement or reduction, whereby characters in various forms having suitable sizes can be formed, and also in that upon enlargement of a character, interpolation is performed in accordance with a certain rule to maintain the figure meant by the character, whereby no matter how the character is enlarged, it is easy to read the character.

It is the first object of the invention to form a character of a desired size by enlarging or reducing a character formed by a pattern of picture elements in any desired magnification in both a longitudinal and a lateral direction.

It is the second object of the invention to subject an enlarged character formed by a pattern of picture elements to interpolation in accordance with a certain rule, whereby no matter of what extent the enlargement of the character may be, the figure meant by the character is maintained to have the character recognized clearly.

It is the third object of the invention to provide a single, small-size apparatus without using an apparatus of a separate system such as a computer.

BRIEF DESCRIPTION OF THE DRAWING

The nature of the present invention as well as other objects and advantages thereof will become more apparent from consideration of the following detailed description and the accompanying drawing in which:

FIGS. 6 and 7 A–D are explanatory views showing an example of interpolation methods;

FIG. 20 is a view in which the dot pattern of FIG. 2 has been expressed using bit pattern;

FIGS. 21 and 22 are views of bit content illustrating a storage condition of registers $M_1$ through $M_9$;

FIGS. 25 A–H and 26 A–D are views illustrating part of the interpolation method of the invention using bit pattern.

DESCRIPTION OF THE PREFERRED EMBODIMENTS

Before illustrating embodiments of the present invention, an explanation is given below on the term "interpolation" as herein used. By the term "interpolation" we mean that, when a matrix pattern formed by plural dots cannot clearly express the object, a dot is formed between adjacent dots.

Figure 1:
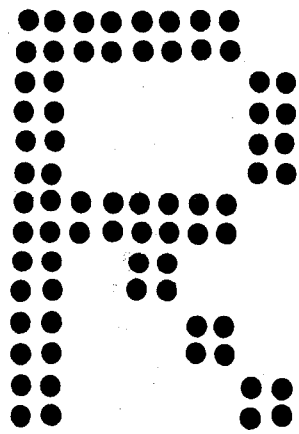
FIG. 1 is an enlarged view of the letter "R" formed by a dot matrix, the letter "R" having been enlarged according to the prior art.
Figure 2:
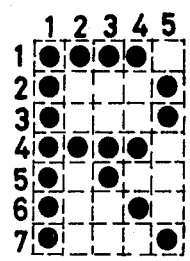
FIG. 2 is a view showing the original letter pattern of the enlarged letter of FIG. 1.
Figure 3:
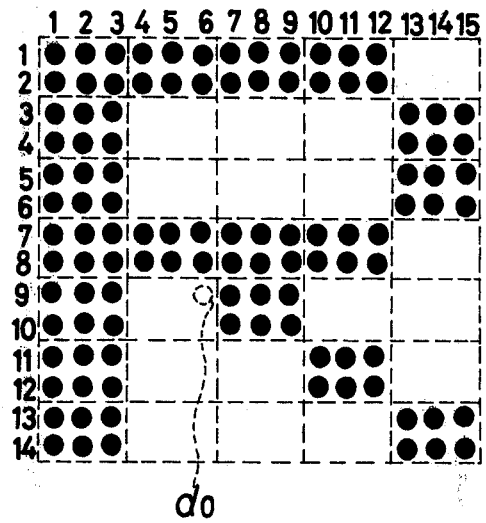
FIG. 3 is an enlarged view of the letter "R" for illustration of an embodiment of the invention.
Figure 4:
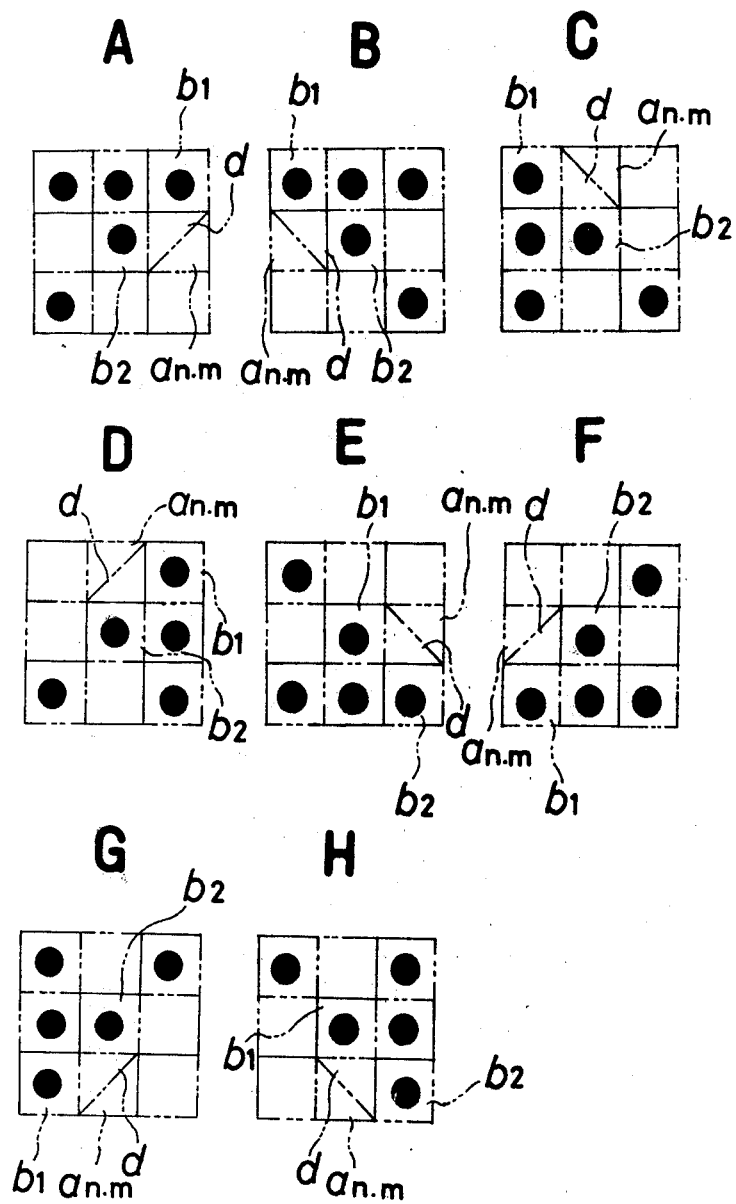
FIGS. 4 A–H and 5 A–D are views of dot arrangement illustrating the methods of interpolation according to the invention.
Figure 5:
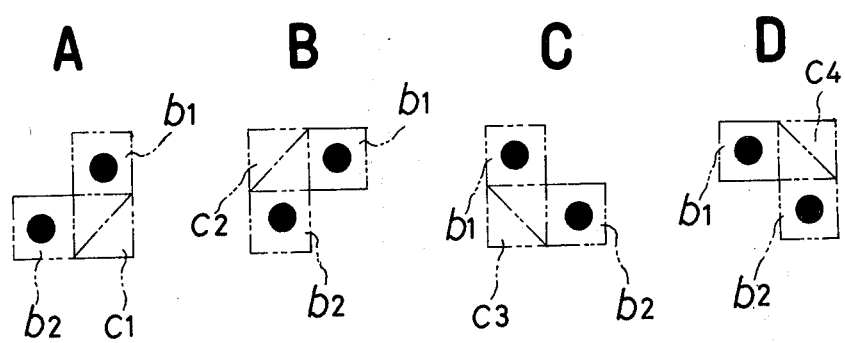

The interpolation method according to the present invention is explained below. FIG. 2 shows the letter "R" constructed by a dot matrix of seven rows and five columns. In FIG. 3, such letter "R" has been enlarged twice in row and three times in column. To the portions which have become obscure as a result of such enlargement, a first interpolation method is performed in a manner explained below. The dotted and the undotted portions in the original dot pattern of FIG. 2 are divided into domains of seven rows and five columns as shown with dotted lines. Then, attention is paid to one domain [n, m] (n and m mean the number of row and column respectively), and a small matrix of three rows and three columns including such domain [n, m] is formed. In this case, however, the small matrix is not an optional small matrix, but it is picked out from the domain of FIG. 2 so that, if the domain [n, m] picked out from FIG. 2 is in the position [p, q] in the number of row and column set in the small matrix, the sum of p and q becomes an odd number. In case, in such small matrix, the domain pattern takes the constructions shown in FIGS. 4A through 4H, interpolation is performed to a portion, d, of the undotted domain $a_{n,m}$ between the dotted domains $b_1$ and $b_2$. If this is applied to FIG. 2, the corresponding domain is the domain [5, 2]. Since this corresponds to the enlarged domain [9, 6] of FIG. 3, a dot $d_0$ is formed in the same domain.

In this way, attention is paid to any one domain and a matrix of three rows and three columns is assumed, then decision is made whether interpolation is needed or not.

The clearness of a character is somewhat raised by application of the foregoing first interpolation method. If a second interpolation method as will be referred to below is further applied, then a character such as a letter, a numeral, a symbol or the like can be reappeared satisfactorily into the figure which the character essentially means. Therefore, an explanation is given below on such second interpolation method. In FIG. 2, attention is paid to any one undotted domain [p, q] and a small matrix of two rows and two columns including such undotted domain [p, q] is assumed. Such any one undotted domain is taken to be $a_{n,m}$ (n and m mean the number of row and column respectively) and the matrix two rows by two columns is taken to be $$\begin{pmatrix} a_{n-1,m} & a_{n-1,m+1} \\ a_{n,m} & a_{n,m+1} \end{pmatrix}.$$

In such matrix, in case the domain $a_{n-1,m+1}$ corresponding to the undotted domain $a_{n,m}$ is undotted and the domains $a_{n-1,m}$ and $a_{n,m+1}$ are dotted, interpolation is performed to part of the undotted domain $a_{n,m}$, and in case the above-mentioned conditions are not satisfied, interpolation is not performed.

FIGS. 5A through 5D show all the positional relationships between undotted domains $C_1$ through $C_4$ and dotted domains $b_1$ and $b_2$, and also show interpolation in each case. If the second interpolation method is applied to FIG. 2, interpolation is performed to [1, 5] [2, 4] [3, 4] [4, 5] [5, 4] [6, 3] [7, 4] and [6, 5] of FIG. 2. In this way, domains to be interpolated are decided in the original character.

Figure 6:
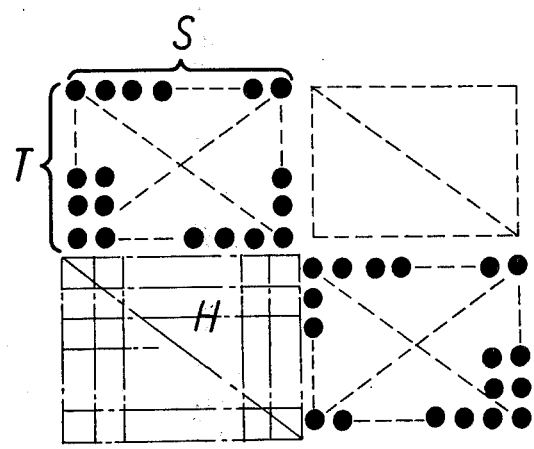

Now, an explanation is given below on the rule for forming dots in the domains to be interpolated when the original character is enlarged. FIG. 6 shows the case in which the original pattern illustrated in FIG. 5C has been enlarged S times in column and T times in row. In FIG. 6, the range to be interpolated is the portion H. FIG. 7D shows the case in which the interpolation portion H alone has been picked up. In the same way, with respect to the original patterns illustrated in FIGS. 5A through 5C, the domains requiring interpolation have been enlarged, and the results are as shown in FIGS. 7A through 7C. In FIG. 7, the reference marks "0" to "x" inclusive represent the number of column in each domain, while the reference marks "0" to "y" inclusive indicate the number of row. The position and number of dots for performing interpolation is decided so as to satisfy the following expressions:

In FIG. 7A, $$Tx + Sy \geq ST \qquad (1)$$

In FIG. 7B, $$T(x+1) + S(y+1) \leq ST \qquad (2)$$

In FIG. 7C, $$Sy \geq T(x+1) \qquad (3)$$

In FIG. 7D, $$S(y+1) \leq Tx \qquad (4)$$

The above inqualities indicate the number of dots to be formed in the domains requiring interpolation, and they have been derived in an experimental manner with respect to the case in which the character undergoing interpolation does not lose naturality.

Figure 8:
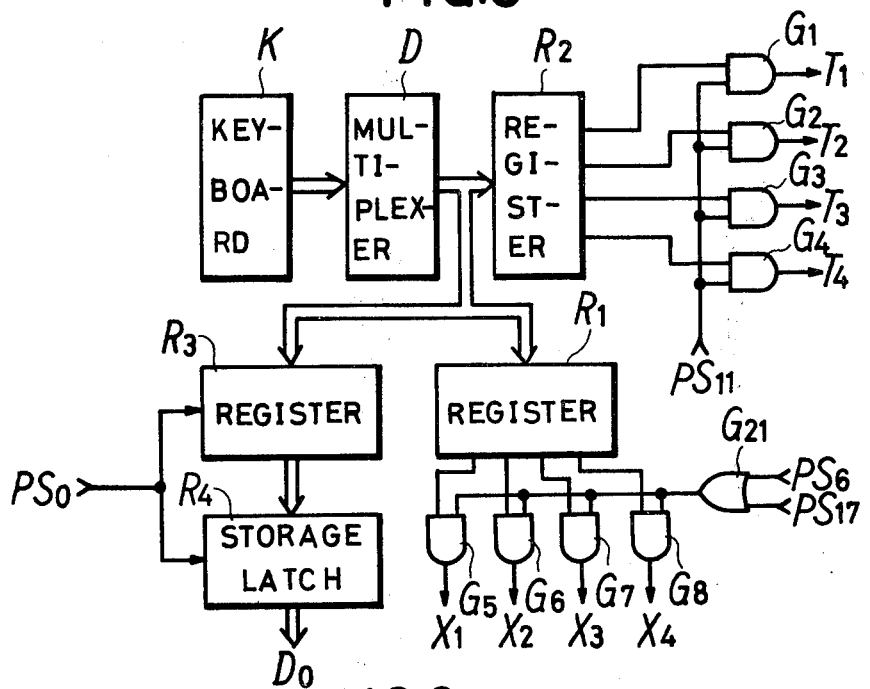
FIGS. 8 through 19 are logical circuit diagrams showing an embodiment of the invention.
Figure 15:
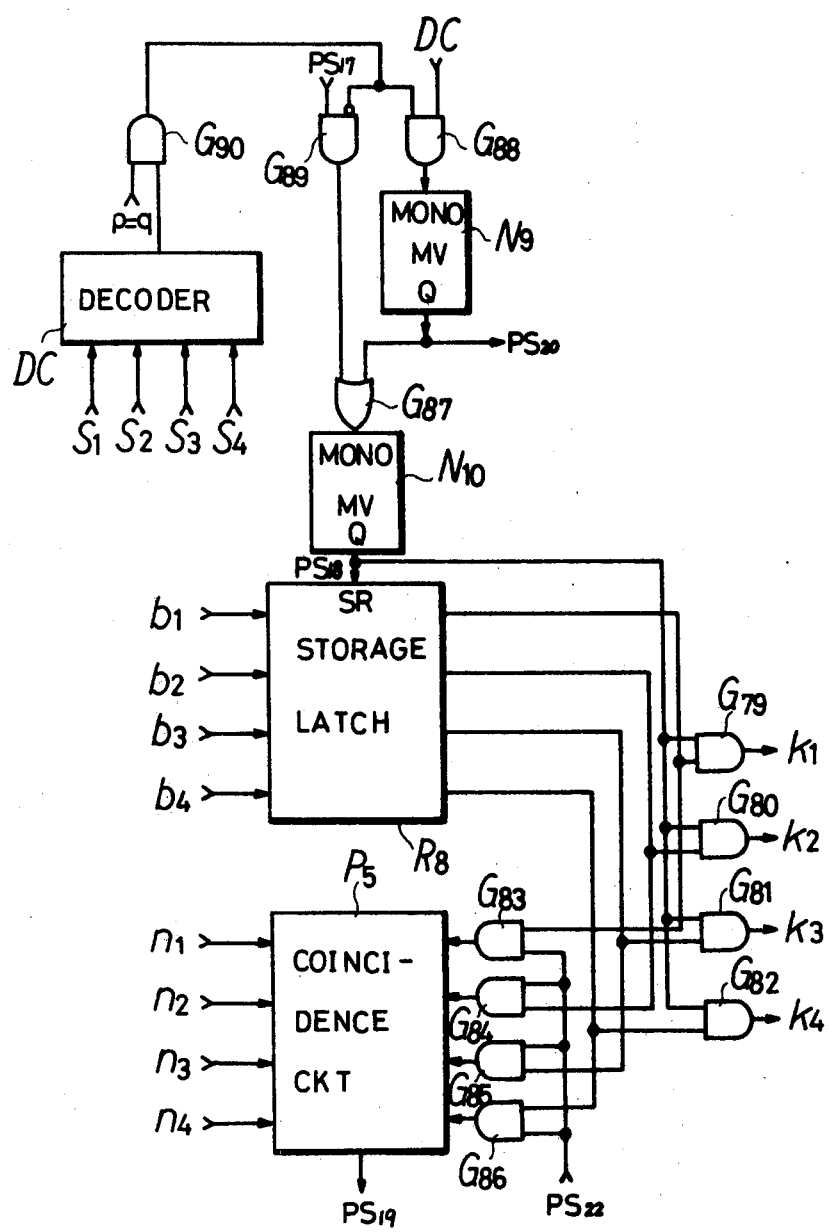
Figure 16:
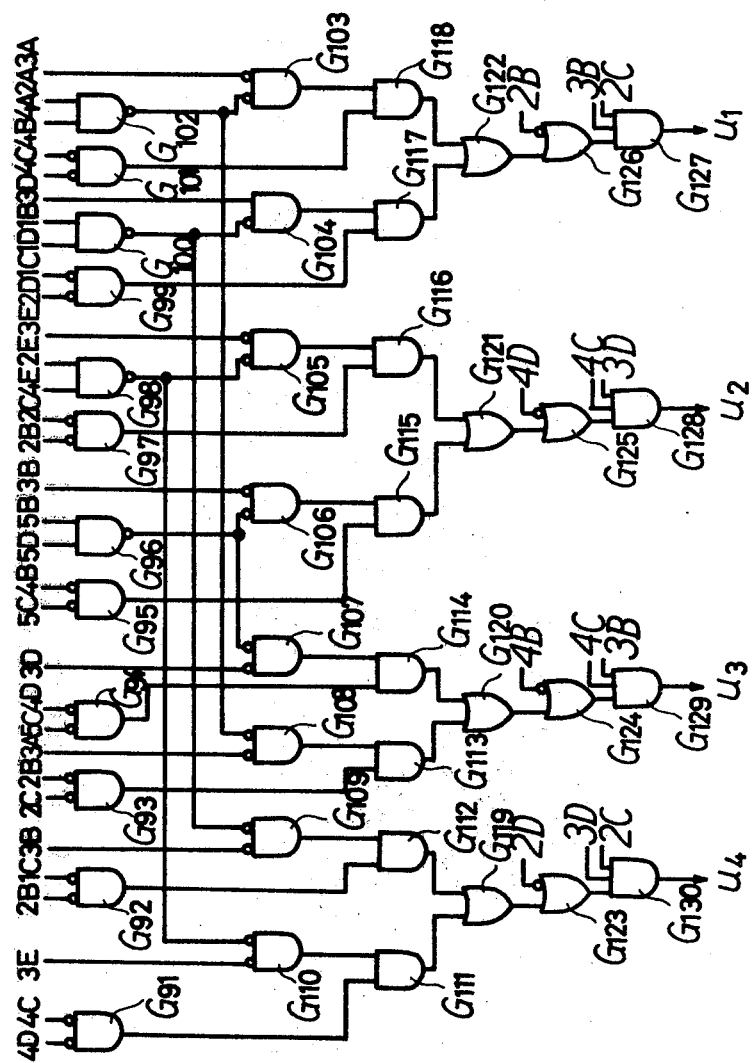

Next, in reference to an apparatus for enlarging and interpolating a character, an explanation is given below on the basis of FIGS. 8 through 17. In FIG. 8, a keyboard K is composed of keyswitches each indicating letters, numerals, symbols or the like, and various data inputed through these keys are transferred to registers $R_1$ and $R_2$ by means of a data multiplexer. The registers $R_1$ and $R_2$ are for storing the magnification of a letter, etc. and they store the magnification of column and row respectively. A register $R_3$ stores data such as a letter, a numeral, etc., of which one word is read out and written in a storage latch $R_4$. An arithmetic unit AD shown in FIG. 10 performs addition and subtraction between various counting contents and storage contents. And a specific operational output of the arithmetic unit AD is stored in a storage latch $R_5$. A storage latch $R_6$ shown in FIG. 11 temporarily stores the output of a counter $C_4$. A shift register $R_7$ shown in FIG. 17, which has a capacity of 7 bits, stores dot data for recording. A character generator CG shown in FIG. 12 effects a code conversion of the output data of the storage latch $R_4$ shown in FIG. 8. This output is stored by shift registers $M_1$ through $M_9$ shown in FIG. 12, the shift registers $M_1$ through $M_9$ having a function of shifting in both a longitudinal and a lateral directions on the drawing. An interpolation detecting circuit U is a circuit for detecting whether interpolation is required or not on the basis of the bit pattern of the original character, and its details are illustrated in FIG. 16. This circuit is adapted to take out each output of the bit pattern stored in the registers $M_1$ through $M_9$ and logically detect the first and the second interpolations. A storage latch $R_8$ shown in FIG. 15 stores specific operational outputs $b_1$ through $b_4$ of the arithmetic unit AD illustrated in FIG. 10.

Figure 11:
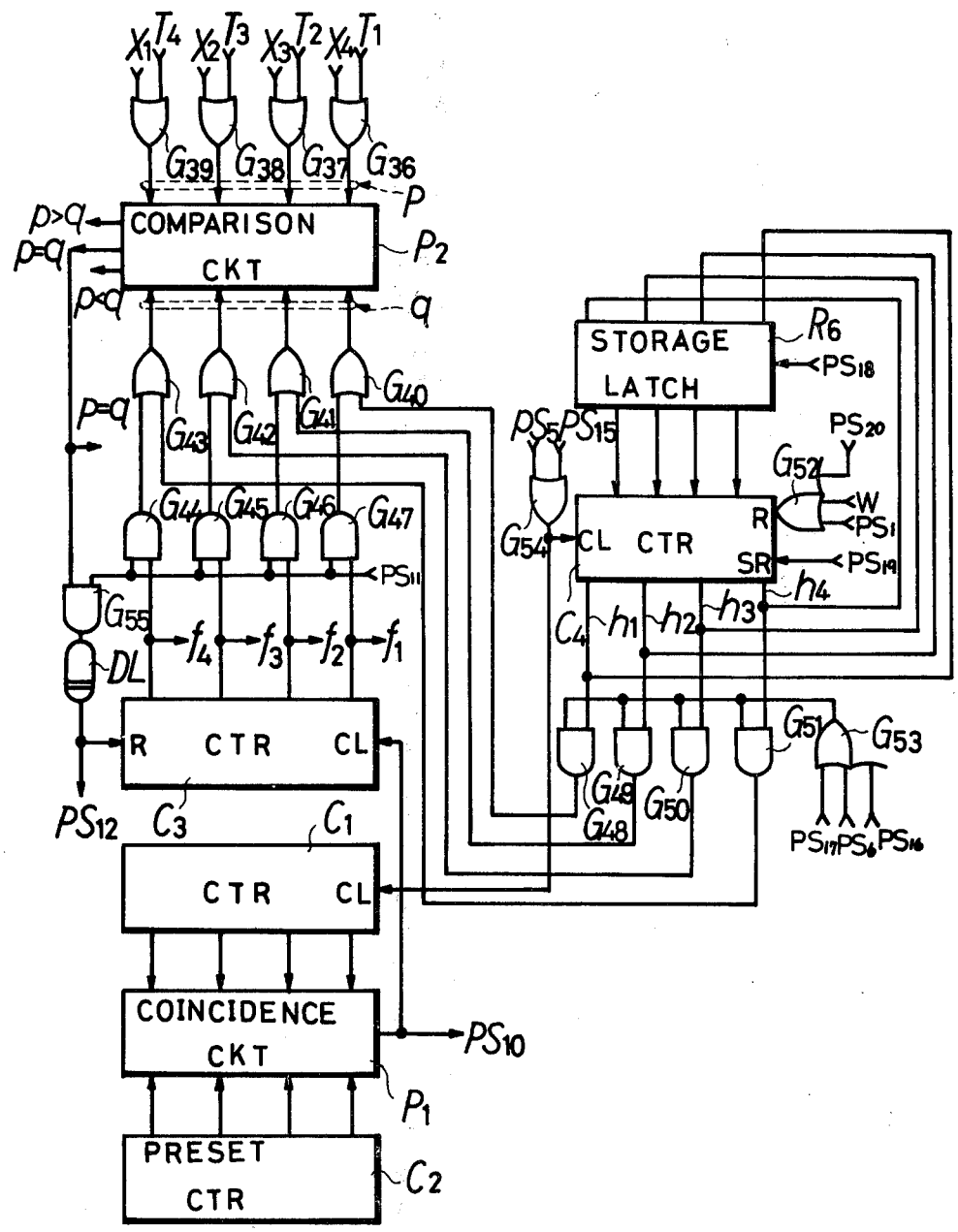
Figure 12:
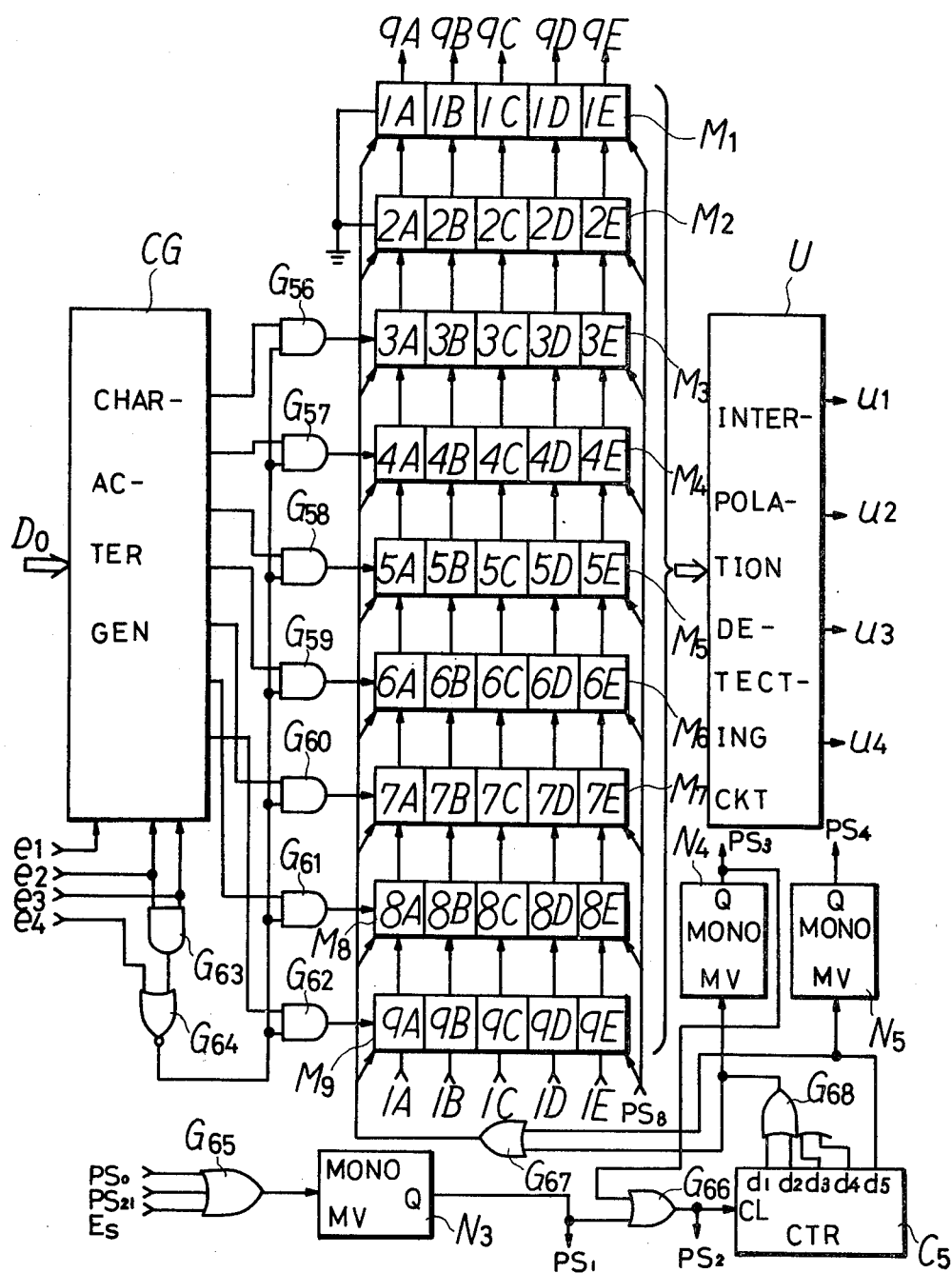

In FIG. 11, the block $C_1$ is a heptal counter and the block $C_2$ is a preset counter in which "7" is set. The block $P_1$ is a coincidence circuit, the blocks $C_3$ and $C_4$ are binary counters and block $P_2$ is a comparison circuit. The block $C_5$ in FIG. 12 is a pental timing counter and it produces a timing pulse in terminals $d_1$ through $d_5$. In a preset counter $C_7$ shown in FIG. 13, "5" is set; and when a counter $C_6$ counts "5", an output is produced from a coincidence circuit $P_3$. A counter $C_8$ shown in FIG. 14 has a decimal counting function; in a preset counter $C_9$ is set "9", and upon coincidence with the output of the counter $C_8$, an output is produced from a coincidence circuit $P_4$. A decoder DC shown in FIG. 15 produces an output when the magnification of a character is "1", "7", "14" . . . . The block $P_5$ represents a coincidence circuit. Monostable multivibrators $N_1$ through $N_{10}$ (hereinafter referred to simply as "Mono Multi") shown in FIGS. 9 and 12 through 15 are used for providing an output timing and also for waveform shaping.

Figure 13:
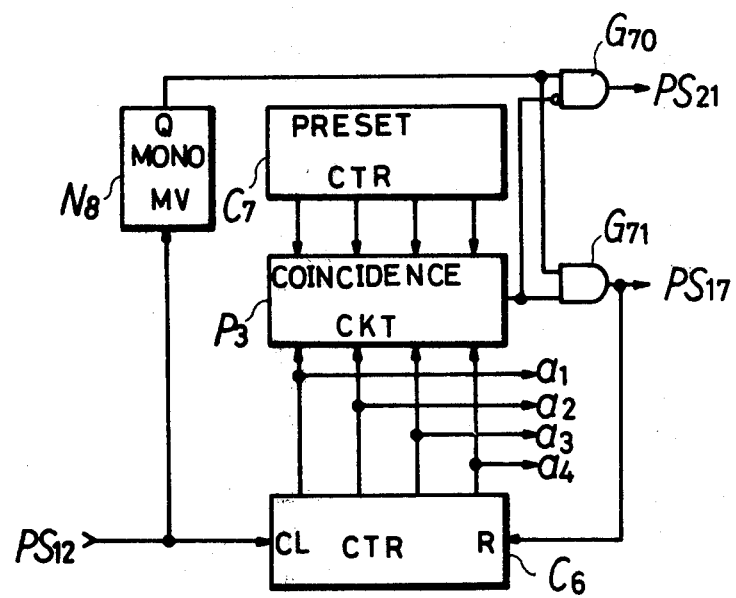
Figure 14:
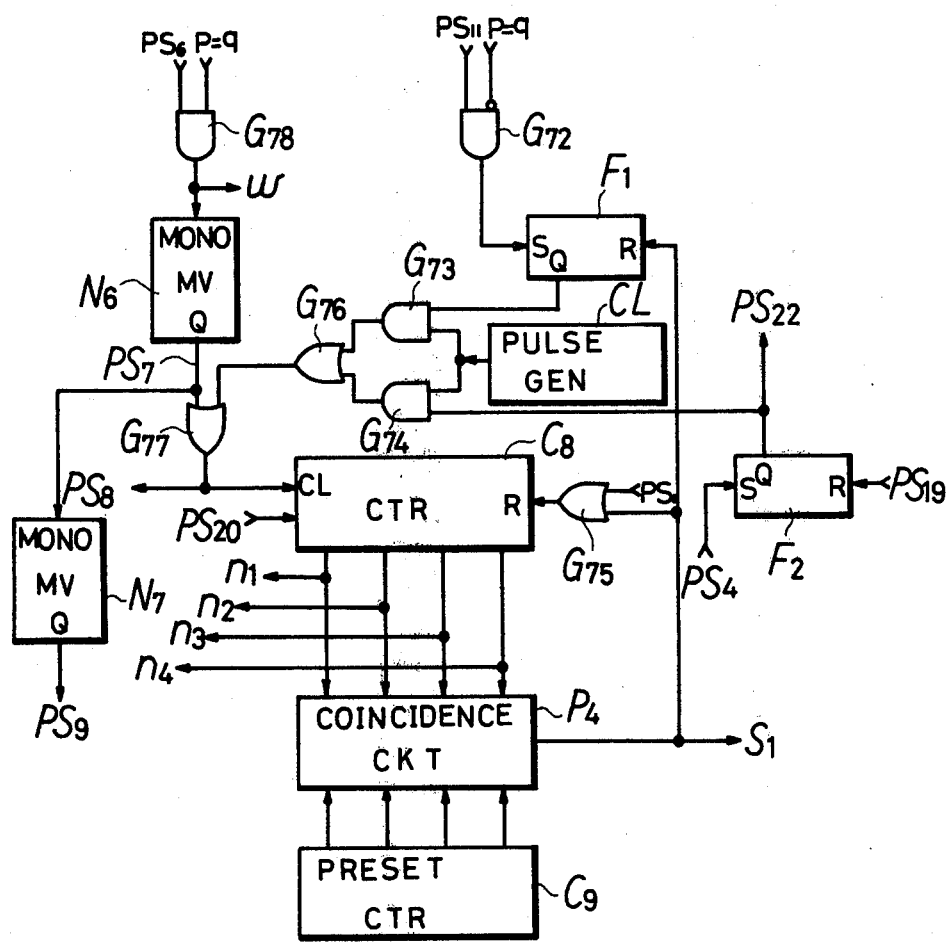
Figure 17:
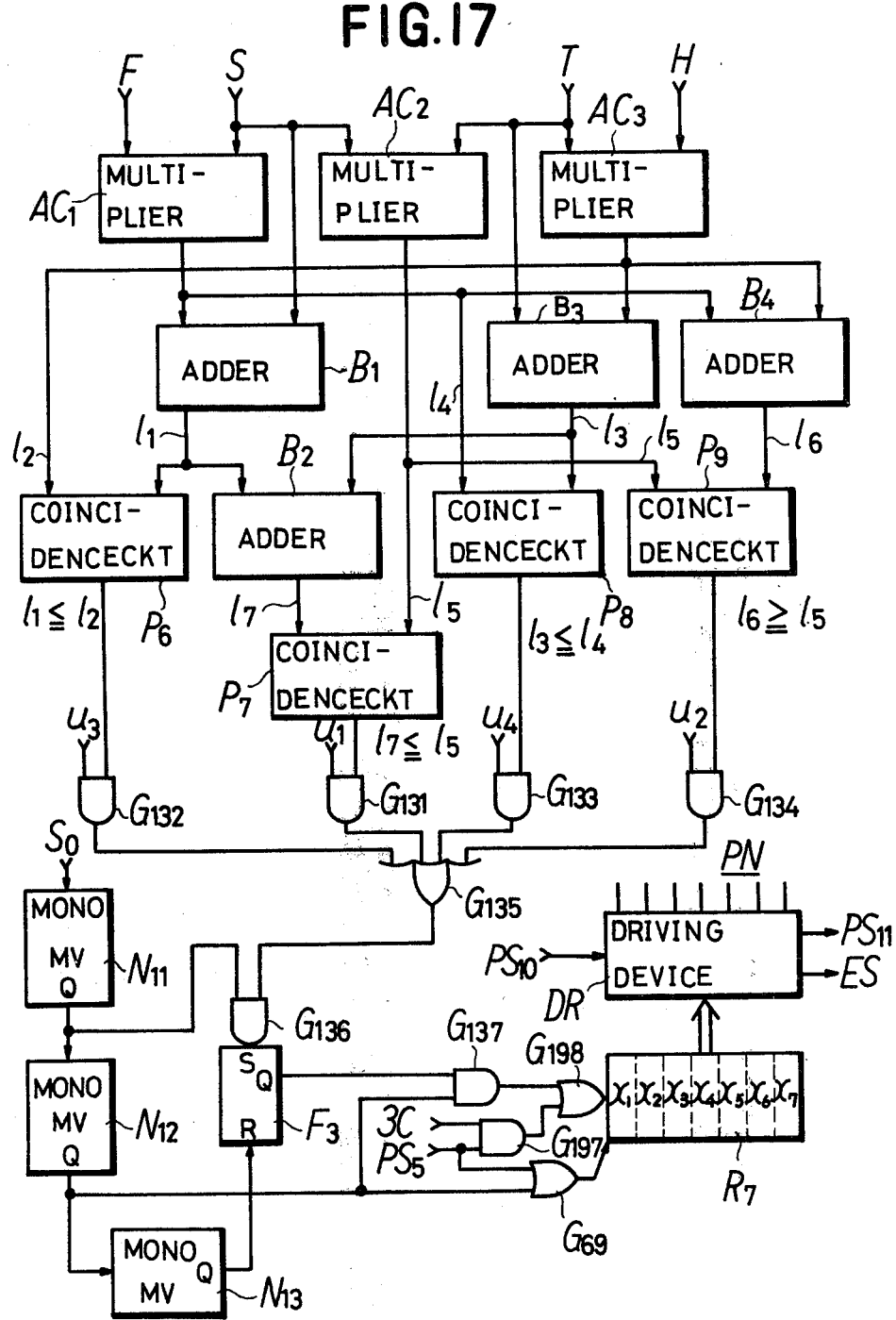

The block DL shown in FIG. 11 represents a delay circuit and the blocks $F_1$ and $F_2$ shown in FIG. 14 are R-S flip-flop circuits. The block DR shown in FIG. 17 represents a driving device for operating a wire dot printer; in this embodiment there is shown the case in which a dot is formed while seven pins are moved in a lateral direction. In FIG. 17, the blocks $AC_1$ through $AC_3$ are multipliers, blocks $B_1$ through $B_4$ are adders and blocks $P_6$ through $P_9$ are coincidence circuits. In FIGS. 8 through 17, the blocks $G_1$ through $G_{137}$ and $G_{197}$, $G_{198}$ are gate circuits.

With respect to the interpolation detecting circuit U shown in FIG. 16, a further detailed explanation is given below. The theoretical values in storage positions (1A to 1E inclusive) through (9A to 9E inclusive) of the registers $M_1$ through $M_9$ shown in FIG. 12 are fed to the input terminals of the gates which are indicated with the same reference marks in FIG. 16. FIG. 16 illustrates the first and the second interpolation methods which have been logically assembled, and its detailed explanation is given below.

First, in the first interpolation method, if the matrix of three rows and three columns is $$\begin{pmatrix} B_{p,q} & B_{p,q+1} & B_{p,q+2} \\ B_{p+1,q} & B_{p+1,q+1} & B_{p+1,q+2} \\ B_{p+2,q} & B_{p+2,q+1} & B_{p+2,q+2} \end{pmatrix}$$

and attention bit is $b_{p+1,q}$, and when the relationship $$\overline{B_{p+1,q}} \cdot \overline{B_{p+1,q+2}} \cdot B_{p,q+2} \cdot B_{p+1,q+1} \cdot B_{p+2,q+2} \cdot \\ (B_{p+2,q+1} \cdot B_{p+2,q} + B_{p,q} \cdot B_{p,q+1}) \times (\overline{B_{p+2,q}} \cdot \\ \overline{B_{p+2,q+1}} + \overline{B_{p,q}} \cdot \overline{B_{p,q+1}}) = 1 \quad (5)$$

is satisfied, the bit $B_{p+1,q}$ is converted to "1". If attention bit is $B_{p,q+1}$, when the relationship $$\overline{B_{p,q+1}} \cdot \overline{B_{p+2,q+1}} \cdot B_{p+1,q+1} \cdot B_{p+2,q+2} \cdot B_{p+2,q} \cdot \\ (\overline{B_{p,q}} \cdot \overline{B_{p+1,q}} + \overline{B_{p,q+2}} \cdot \overline{B_{p+1,q+2}}) \times (B_{p,q} \cdot B_{p+1,q} + \\ B_{p,q+2} \cdot B_{p+1,q+2}) = 1 \quad (6)$$

is satisfied, and if attention bit is $B_{p+1,q+2}$ when the relationship $$\overline{B_{p+1,q+2}} \cdot \overline{B_{p+1,q}} \cdot B_{p,q} \cdot B_{p+1,q+1} \cdot B_{p+2,q} \cdot \\ (\overline{B_{p,q+1}} \cdot \overline{B_{p,q+2}} + \overline{B_{p+2,q+1}} \cdot \overline{B_{p+2,q+2}}) \times (B_{p,q+1} \cdot \\ B_{p,q+2} + B_{p+2,q+1} \cdot B_{p+2,q+2}) = 1 \quad (7)$$

is satisfied, and if attention bit is $B_{p+2,q+1}$, when the relationship $$\overline{B_{p+2,q+1}} \cdot \overline{B_{p,q+1}} \cdot B_{p,q} \cdot B_{p+1,q+1} \cdot B_{p,q+2} \cdot \\ (\overline{B_{p+1,q}} \cdot \overline{B_{p+2,q}} + \overline{B_{p+1,q+2}} \cdot \overline{B_{p+2,q+2}}) \times (B_{p+1,q} \cdot \\ B_{p+2,q} + B_{p+1,q+2} \cdot B_{p+2,q+2}) = 1 \quad (8)$$

is satisfied, those attention bits are conveted to "1".

If the matrix two rows by two columns is $$\begin{pmatrix} A_{p,q} & A_{p,q+1} \\ A_{p+1,q} & A_{p+1,q+1} \end{pmatrix}$$

and attention bit is $A_{p+1,q}$ or $A_{p,q+1}$, and when the relationship $$\overline{A_{p+1,q}} \cdot \overline{A_{p,q+1}} \cdot A_{p,q} \cdot A_{p+1,q+1} = 1$$

is satisfied, the bit $A_{p+1,q}$ or $A_{p,q+1}$ is converted to "1". If attention bit is $A_{p,q}$ or $A_{p+1,q+1}$, and when the relationship $$\overline{A_{p,q}} \cdot \overline{A_{p+1,q+1}} \cdot A_{p+1,q} \cdot A_{p,q+1} = 1$$

is satisfied, the attention bit is converted to "1". Consequently, when attention bit is "0" and when the relationship $$\overline{A_{p+1,q}} \cdot \overline{A_{p,q+1}} \cdot A_{p,q} \cdot A_{p+1,q+1} + \overline{A_{p,q}} \cdot \overline{A_{p+1,q+1}} \cdot \\ A_{p+1,q} \cdot A_{p,q+1} = 1 \quad (9)$$

is satisfied, the attention bit is converted to "1". FIG. 16 shows the case where attention bit was taken to be in storage position 3C of the register $M_3$ shown in FIG. 12 and the logical relationship of the aforementioned (5) through (9) was summarized.

Next, an explanation on operation is given below; to be more specific, an explanation is made on the operation of the case where the original pattern of the letter "R" used in FIG. 2 is enlarged twice in row and three times in column as is shown in FIG. 3 and interpolation is performed. In FIG. 8, the magnifications "2" and "3" respectively of row and column of the letter as well as the character data for one line for printing are inputed from the keyboard K and are written in the magnification registers $R_1$ and $R_2$ and the data register $R_3$ respectively through the data multiplexer D. By a printing instruction PSo given from the keyboard side, the letter "R" is read from the register $R_3$ and is transcribed in the storage latch $R_4$ for one word. This output Do is fed to the input of the character generator CG shown in FIG. 12, where it is converted to the bit pattern illustrated in FIG. 20 in which the dots and the undotted portions shown in FIG. 2 have been converted to "1" and "0" respectively. At the same time, the output PSo triggers the Mono Multi $N_3$ through the gate circuit $G_{65}$ shown in FIG. 12 and goes to an output $PS_1$, which feeds a logical value (11) to the two inputs of the arithmetic unit AD through the gate circuits $G_{13}$ through $G_{15}$ shown in FIG. 10. The other two inputs of the arithmetic unit AD, that is, the outputs of the gate circuits $G_{16}$ and $G_{17}$, are in a state of (00), so that in one input of the arithmetic unit AD is fed (0011), that is, a decimal "3". Further, the output $PS_1$ opens the gate circuits $G_{26}$ through $G_{29}$ shown in FIG. 10 and (0000) of the outputs $a_1$ through $a_4$ of the already-cleared counter $C_6$ shown in FIG. 13 is fed to the arithmetic unit AD. Consequently, "3" is produced in the output of the arithmetic unit AD, and the output $PS_1$ of the Mono Multi $N_3$ shown in FIG. 12 which has been triggered by the output PSo goes to $PS_2$ through the gate circuit $G_{66}$, whereby the said "3" is written in the storage latch $R_5$ shown in FIG. 10. The outputs $e_1$ through $e_3$ of the storage latch $R_5$ designate the third column of the character generator CG shown in FIG. 12. Consequently, the data of the third column in the bit pattern shown in FIG. 20 is put out. The reason why the third column of the bit pattern of the letter "R" is first read, is as follows. In the foregoing first and second interpolation methods, attention is paid to any one undotted domain and when the presence and absence of surrounding dots are in a certain relationship, interpolation is performed to the noticed, undotted domain. In this example, in which the presence and absence of dot dorrespond to logical "1" and "0" respectively, the attention bit shifts to a certain storage position in register and decision is made by the interpolation detecting circuit U as to whether the bit in such storage position is "1" or "0" and, when it is "0", as to whether the surrounding bit pattern requires the first or the second interpolation method. FIGS. 25 and 26 show the case in which the foregoing dot patterns for interpolation have been converted to bit patterns of "1" and "0" and in which the bit $b_0$ indicates attention bit. The data bits of each column of the bit pattern read from the character generator CG are stored in the registers $M_3$ through $M_9$. In this example, attention bit is shifted to the storage position 3C of the register $M_3$ and, with this bit as the center, correlation thereof with surrounding bits is studied.

Figure 10:
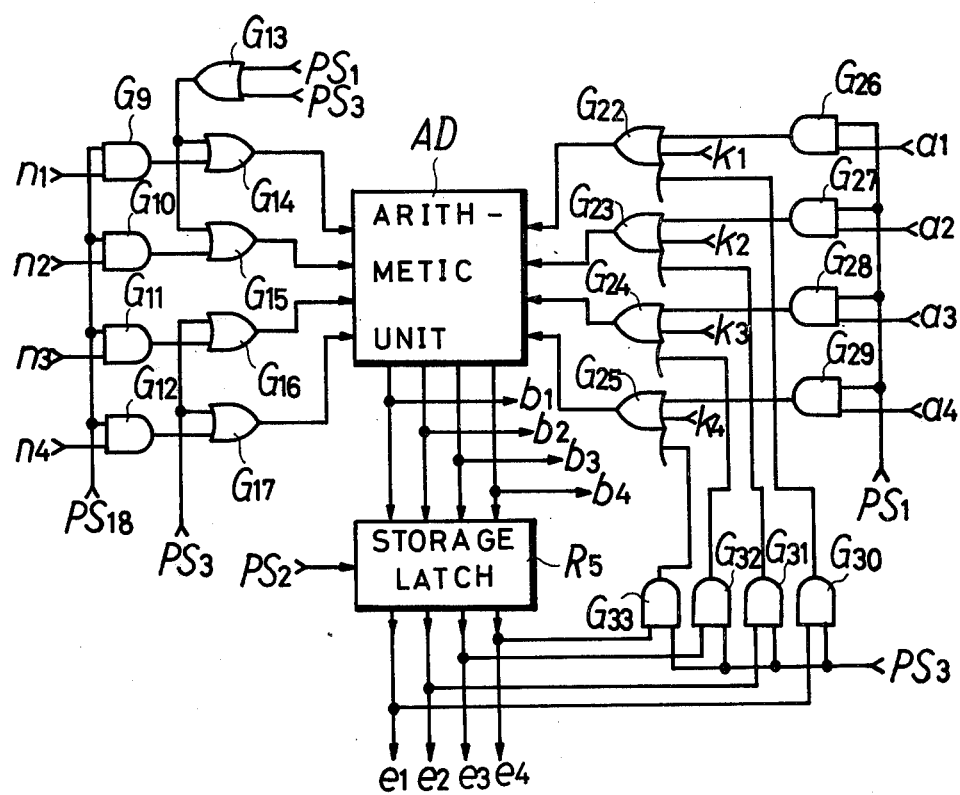

Now returning to the foregoing explanation, the third column of the bit pattern of FIG. 20 stored in the character generator CG is designated by the outputs $e_1$ through $e_3$ of the storage latch shown in FIG. 10 and the data bits of the third column (1001100) are fed to the registers $M_3$ to $M_9$ inclusive through the gate circuits $G_{56}$ to $G_{62}$ inclusive shown in FIG. 12. On the other hand, the counter $C_5$ is advanced by "1" by the foregoing output $PS_2$, thus producing an output in its terminal $d_1$, whereby the contents of the registers $M_1$ through $M_9$ are shifted by one bit to the right through the gate circuits $G_{68}$ and $G_{67}$. As a result, the data bits of the third column mentioned above are transcribed in the storage positions 3A through 9A of the registers $M_3$ through $M_9$. The reason why the registers $M_1$ and $M_2$ have been provided is that at most two bits in the two rows above the attention bit are required as the object of detection. Mono Multi $N_4$ is triggered by the output of the foregoing terminal $d_1$ and its output $PS_3$ is fed to one input of the arithmetic unit AD through the gate circuit $G_{13}$ to $G_{17}$ inclusive shown in FIG. 10. On the other hand, the output $PS_3$ opens the gate circuit $G_{30}$ through $G_{33}$ and feeds (0011) of outputs $e_1$ through $e_4$, that is, decimal "3", to the other input of the arithmetic unit AD, so that (0010), that is, decimal "2", is produced at the output of the arithmetic unit AD and it is written in the storage latch $R_5$ by the fall of the output $PS_2$. The data bits of the second column in the bit pattern of "R" shown in FIG. 20 are designated by the outputs $e_1$ through $e_4$ of the storage latch $R_5$ and are fed to the registers $M_3$ through $M_9$. The counter $C_5$ shown in FIG. 12 is advanced by "1" by the foregoing output $PS_2$ and counts "2". By the output of its terminal $d_2$ the contents of the registers $M_3$ through $M_9$ are shifted by one bit to the right and the data bits of the third column are transcribed to the storage positions 3B through 9B and the data bits of the second column to the storage positions 3A through 9A. In the same way, the data bits of the first column are transcribed to the storage positions 3A through 9A of the registers $M_3$ through $M_9$. The subsequent outputs $e_2$ through $e_4$ close the gate circuits $G_{56}$ to $G_{62}$ inclusive through the gate circuits $G_{63}$ and $G_{64}$ and feed "0" to the inputs of the registers $M_3$ through $M_9$. Consequently, after a total of five shifts, the storage contents of the registers $M_3$ through $M_9$ become the bit pattern illustrated in FIG. 21.

When attention is paid to the content of the storage position 3C of the register $M_3$ shown in FIG. 12, that is [$M_3$, C] shown in FIG. 21, its bit is "1" and therefore this does not become the object of interpolation. The output "1" of the storage position 3C of the register $M_3$ shown in FIG. 12 closes the gate circuit $G_{18}$ shown in FIG. 9 and at the same time opens the gate circuit $G_{19}$. At this moment, in the other input of the gate circuit $G_{19}$ is fed through the gate circuit $G_{20}$ the output $PS_4$ of Mono Multi $N_5$ which has been triggered by the output of the last terminal $d_5$ of the counter $C_5$. This output triggers Mono Multi $N_1$, the output of which $PS_5$ is fed to the gate circuit $G_{69}$ shown in FIG. 17. The content of the shift register $R_7$ is shifted by one bit and in the storage position $X_1$ is written "1" which is fed to the input through the gate circuit $G_{197}$. On the other hand, the foregoing output $PS_5$ advances the content of the counter $C_4$ by "1" through the gate circuit $G_{54}$ shown in FIG. 11. The counter $C_4$ is for counting the magnification of row of an enlarged dot pattern. The outputs $h_1$ through $h_4$ of the counter $C_4$ which has counted the above-mentioned "1" are fed to the gate circuits $G_{48}$ through $G_{51}$. In this case, since the gate circuits $G_{48}$ through $G_{51}$ are opened by the output $PS_6$ of Mono Multi $N_2$ shown in FIG. 9 which has been triggered by the output $PS_5$, the output $h_1$ through $h_4$ pass through the gate circuits $G_{48}$ to $G_{51}$ inclusive and are fed to one inputs 'q' of the comparison circuit $P_2$ through the gate circuits $G_{40}$ to $G_{43}$ inclusive. The row magnification "2" stored in the register $R_1$ shown in FIG. 8 passes through the gate circuits $G_5$ to $G_8$ inclusive since the latter circuits are opened by the output $PS_6$ and is fed to the other inputs 'p' of the comparison circuit $P_2$ through the gate circuits $G_{36}$ to $G_{39}$ inclusive. The set magnification is "2" and the value of the counter $C_4$ is "1" and thus coincidence is not obtained; therefore, the coincidence output $p=q$ of the comparison circuit $P_2$ does not change. On the other hand, the foregoing output $PS_5$ advances the content of the counter $C_1$ by "1" through the gate circuit $G_{54}$. The counter $C_1$ is for counting the number of bits stored in the register $R_7$ shown in FIG. 17.

Figure 9:
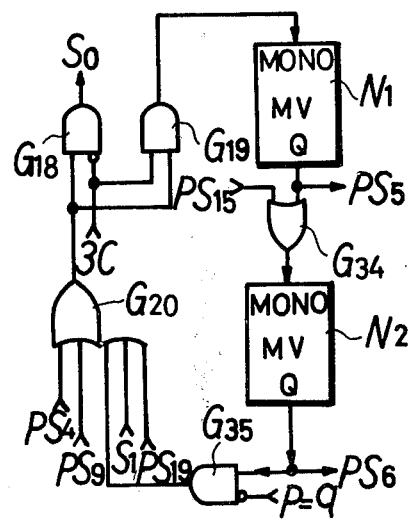

Further, the output $PS_5$ is fed through the gate circuit $G_{34}$, Mono Multi $N_2$, gate circuit $G_{35}$ and gate circuit $G_{20}$ to the gate circuit $G_{19}$ as is shown in FIG. 9. Since the gate circuit $G_{19}$ is opened by the output "1" of the storage position 3C of the register $M_3$, the output of the gate circuit $G_{20}$ passes through the gate circuit $G_{19}$ and triggers Mono Multi $N_1$, thus again producing the output $PS_5$. This output $PS_5$ shifts the register $R_7$ by one bit through the gate circuit $G_{69}$ shown in FIG. 17, whereby the output "1" of the storage position 3C is written in the storage position $X_1$ of the register $R_7$. Consequently, "1" is stored in both storage positions $X_1$ and $X_2$ of the register $R_7$. On the other hand, the output $PS_5$ advances by "1" the content of the counter $C_1$ shown in FIG. 11, so that its counting content becomes "2". Further, the output $PS_5$ makes the content of the counter $C_4$ into "2". This counting outputs $h_1$ through $h_4$ are fed to one inputs 'q' of the comparison circuit $P_2$ in the same way as hereinbefore described, where they are compared with the row magnification "2". Since both objects of comparison are "2", there is produced "1" at the output $p=q$ of the comparison circuit $P_2$. As a result, from the gate circuit $G_{78}$ shown in FIG. 14 there is produced an output W, which resets the counter $C_4$ through the gate circuit $G_{56}$ shown in FIG. 11. On the other hand, the output W triggers Mono Multi $N_6$ shown in FIG. 14, thus causing an output $PS_7$ to be produced, which goes to $PS_8$ through the gate circuit $G_{77}$, whereby the content of the counter $C_8$ is advanced by "1".

The output $PS_8$ is applied as a shift pulse in a longitudinal direction of the registers $M_1$ through $M_9$ shown in FIG. 12, whereby the contents of lower rank registers of the registers $M_1$ through $M_9$ are transcribed to higher rank registers, and the resulting content is as shown in FIG. 22. Consequently, in the storage position 3C of the register $M_3$ is stored the bit corresponding to the two rows and one column of the matrix in the bit pattern of FIG. 20, and this bit becomes attention bit. The output $PS_7$ of Mono Multi $N_6$ shown in FIG. 14 triggers Mono Multi $N_7$ and produces an output $PS_9$, which is fed to the gate circuit $G_{19}$ through the gate circuit $G_{20}$ shown in FIG. 9.

Thereafter, in an identical manner as hereinbefore described, "1" and "1" are stored in the register $R_7$ shown in FIG. 17. When in this way seven bits, that is, the bits corresponding to the dots of the number of the row and the column of the matrix [z, 1] (z being an integer from 1 to 7) shown in FIG. 3, have been stored in the register $R_7$, an output of "7" is produced from the counter $C_1$ shown in FIG. 11. Since this output coincides with the "7" stored in the preset counter $C_2$, a coincidence output $PS_{10}$ is produced in the coincidence circuit $P_1$ and the content of the counter $C_3$ is advanced by "1". At the same time, the coincidence output $PS_{10}$ actuates the wire driving circuit DR shown in FIG. 17 so that each wire is driven correspondingly to the storage content of the register $R_7$. The wire head continues moving. As the contents of the register $R_7$ are all "1", all the wires PN are driven to form the seven dots of the first column shown in FIG. 3. On the other hand, after the output $PS_{10}$ has been fed to the wire driving device DR, an output $PS_{11}$ is produced from this wire driving device DR. By the output $PS_{11}$ the gate circuits $G_{44}$ through $G_{47}$ shown in FIG. 11 are opened and the output "1" of the counter $C_3$ is fed to one inputs 'q' of the comparison circuit $P_2$ through the gate circuits $G_{40}$ to $G_{43}$ inclusive.

On the other hand, the column magnification "3" stored in the register $R_2$ is fed to the other inputs 'p' of the comparison circuit $P_2$ through the gate circuits $G_1$ through $G_4$ shown in FIG. 8 and $G_{36}$ through $G_{39}$ shown in FIG. 11. Since both values for comparison are different, the output $p=q$ of the comparison circuit $P_2$ does not change. Consequently, the gate circuit $G_{72}$ shown in FIG. 14 produces an output to set the flip-flop circuit $F_1$, whose output opens the gate circuit $G_{73}$, so that the output of the clock pulse generator CL is fed to the counter $C_8$ through the gate circuits $G_{73}$, $G_{76}$ and $G_{77}$. As the counter $C_8$ has already counted shift pulses three times, its content is "3". If, in addition, six pulses of the foregoing clock pulse are fed, the value on the counter $C_8$ becomes "9", and coincidence thereof with the preset value "9" of the counter $C_9$ is obtained in the coincidence circuit $P_4$. While this coincidence output $S_1$ resets the counter $C_8$ through the gate circuit $G_{75}$, it resets the flip-flop circuit $F_1$ to close the gate circuit $G_{73}$, thus causing the provision of the clock pulse to the counter $C_8$ to be stopped. The aforementioned six pulses through the gate circuit $G_{77}$ are fed as a longitudinal shift pulse for the registers $M_1$ through $M_9$ shown in FIG. 12 and, therefore, the contents of the registers are shifted six times successively from lower rank to higher tank registers. This is for returning the storage contents of registers $M_1$ through $M_9$ to the bit pattern in the initial state shown in FIG. 21. That is, the initial storage content has been re-obtained by shifting nine times from the initial state. Then, the dots of the second column, that is, the dots of the number of the row and the column of the matrix [Y, 2] (Y being an integer from 1 to 7), are formed in the same way as hereinbefore described. At the end of such dot formation, the counter $C_6$ shown in FIG. 11 counts "2" and this counting output is compared with the magnification "3" by the comparison circuit $P_2$. Since the two values do not coincide with each other, the output $p=q$ of the comparison circuit $P_2$ does not change and the same operation as hereinbefore described is repeated.

When the dots as far as the third column in FIG. 3 have been formed in this way, the value on the counter $C_3$ shown in FIG. 11 becomes "3". Coincidence of this value with the column magnification "3" produces a logical value "1" in the output $p=q$ of the comparison circuit $P_2$ shown in FIG. 11. As a result, an output is produced from the gate circuit $G_{55}$ and this delay output $PS_{12}$ resets the counter $C_3$. Also, the output $PS_{12}$ advances by "1" the content of the counter $C_6$ shown in FIG. 13. Further, the output $PS_{12}$ triggers Mono Multi $N_8$, the output of which is fed to the gate circuit $G_{70}$. In this condition, the output of the coincidence circuit $P_3$ is "0" and so the gate circuit $G_{70}$ is kept open, which causes an output $PS_{21}$ to be produced from Mono Multi $N_8$. The output $PS_{21}$ advances the value on the counter $C_5$ by "1" through the gate circuit $G_{65}$, Mono Multi $N_3$ and gate circuit $G_{66}$. On the other hand, with the output $PS_2$, the output of the arithmetic unit AD shown in FIG. 10 is transcribed in the memory latch $R_5$, the output of which designates a column in the character generator CG shown in FIG. 12. Consequently, the second column shown in FIG. 20 is read from the character generator CG so that it is stored in the storage positions 3C through 9C of the registers $M_3$ through $M_9$.

Thereafter, dots are formed in the same manner as hereinbefore described. In case "0" has been stored in the storage position 3C of the register $M_3$ shown in FIG. 12 though this does not accord with the interpolation methods of the present invention, for example, in the case of non-dot as is shown by the domain of the number of the row and the column of the matrix [5, 4] in FIG. 3 operation is different from that hereinbefore described.

Since the content of the storage position 3C is "0", the gate circuit $G_{18}$ shown in FIG. 9 is opened and the output of the gate circuit $G_{20}$ goes to an output So through the gate circuit $G_{18}$. The output So triggers Mono Multi $N_{11}$ shown in FIG. 17, the output of which opens the gate circuit $G_{136}$. Since this example does not accord with the interpolation method of the invention, the outputs $U_1$ through $U_4$ of the interpolation detecting circuit shown in FIG. 16 are "0". Consequently, the output of the gate circuit $G_{135}$ shown in FIG. 17 is "0" and also the output of the gate circuit $G_{136}$ is kept "0", so that the flip-flop circuit $F_3$ is not set and assumes a reset state. As a result, the output of the gate circuit $G_{137}$ becomes "0", the output of Mono Multi $N_{12}$ shifts the register $R_7$ by one bit and the output "0" of the gate circuit $G_{137}$ is written in the register $R_7$. Thereafter, the flip-flop circuit $F_3$ is reset by the output of Mono Multi $N_{13}$.

Assuming that the dots up to the ninth column in the dot pattern shown in FIG. 3 have been formed in the same way, the counter shown in FIG. 13 now counts "3".

Accordingly, the range of from the 10th to 15th columns and from the 1st to 4th rows in FIG. 3 accords the interpolation method as has been explained hereinbefore in connection with FIGS. 6 and 7. The interpolation range from the 10th to 12th columns and from the 3rd to 4th rows corresponds to FIG. 7D. When a non-dot "0" in such an interpolation range has been stored in the storage position 3C shown in FIG. 12, the output $U_4$ of the interpolation detecting circuit shown in FIG. 16 becomes "1" and the outputs $U_1$ through $U_3$ become "0". Whether or not dots should be formed in the interpolation range is decided by the circuit shown in FIG. 17. First, a study is made below on the domain of the number of the row and the column of the matrix [3, 10]. The outputs $f_1$ through $f_4$ (hereinafter referred to generically as "F") of the counter $C_3$ shown in FIG. 11 are "0", the outputs $h_1$ through $h_4$ (hereinafter referred to generically as "H") of the counter $C_4$ also shown in FIG. 11 are "0", the set row magnification S is "2" and column magnification T is "3", and these are all put in the circuit shown in FIG. 17. Consequently, the output of the multiplier $AC_1$ and that of $AC_3$ become "0" and the output of the adder $B_3$ becomes "3". As a result, the input relationship of the comparator $P_8$ becomes $l_3 > l_4$ and its output becomes "0" and consequently the output of the gate circuit $G_{133}$ goes to "0". Since the other outputs $V_1$ through $V_3$ are "0", the output of the gate circuit $G_{135}$ becomes "0" and it is stored in the register $R_7$ in the same manner as hereinbefore described.

As an example, with respect to the number of the row and the column of the matrix [3, 12] shown in FIG. 3, whether or not interpolation is performed below. In this domain, the output F of the counter $C_3$ shown in FIG. 11 is "2" and the output H of the counter $C_4$ is "0" and consequently, in FIG. 17, the output of the multiplier $AC_1$ is "4", that is $l_4 = 4$. Further the output of the multiplier $AC_3$ is "0" and that of the adder $B_3$ becomes "3", so that the input of the comparator $P_8$ is $l_4 > l_3$ and at the output thereof "1" is produced. As set forth hereinbefore, the input $U_4$ of the gate circuit $G_{133}$ is "1" and so it is produced at the output of the gate circuit $G_{133}$; consequently, "1" is produced at the output of the gate circuit $G_{135}$. The gate circuit $G_{136}$ is kept open by the output of the Mono Multi $N_{11}$ shown in FIG. 17 which has been triggered by the output So of the gate circuit $G_{18}$ shown in FIG. 9. Therefore, the resulting output sets the flip-flop circuit $F_3$ and gives "1" at one input of the gate circuit $G_{137}$. Pulse from Mono Multi $N_{12}$ produces "1" at the output of the gate circuit $G_{137}$ and the register $R_7$ is shifted by one bit through the gate circuit $G_{69}$, and the above-mentioned output "1" is written in the register $R_7$. This becomes a dot for interpolation.

Next, in the case of the number of the row and column of the matrix [4, 12] in FIG. 3, the output F of the counter $C_3$ is "2" and the output H of the counter $C_4$ is "1". Consequently, the output $l_4$ of the multiplier $AC_1$ is "4" and that of the multiplier $AC_3$ is "3" and, therefore, the output $l_3$ of the adder $B_3$ becomes "6". The input relationship of the comparator $P_8$ becomes $l_4 > l_3$ and the output thereof becomes "0", so that the output of the gate circuit $G_{133}$ becomes "0" and in the register $R_7$ is written "0" in the same manner as hereinbefore described. This means that interpolation is not performed.

Thus, in the undotted domain of a bit pattern, whether or not it corresponds with the interpolation method of the present invention is detected by the interpolation detecting circuit, and whether or not a dot should be formed in the undotted domain is detected by the upper half circuit of FIG. 17 and interpolation is made.

Figure 18:
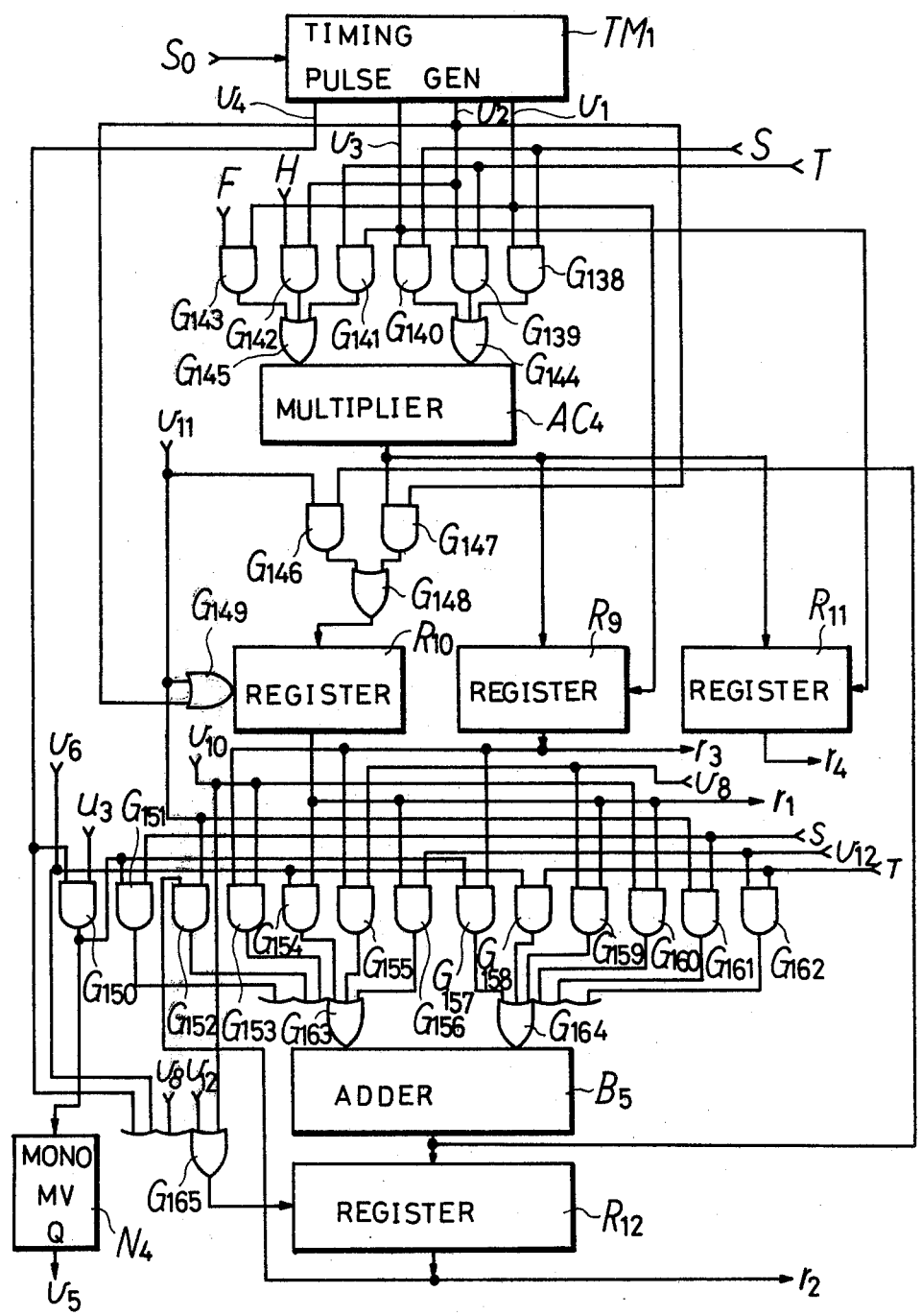

FIG. 18 shows another example of FIG. 17. The reference marks $G_{138}$ through $G_{196}$ are gate circuits, the reference marks $N_{14}$ through $N_{17}$ are monostable multivibrators (hereinafter referred to simply as "Mono Multi"), the reference mark $AC_4$ is a multiplier, $B_5$ is an adder, $P_{10}$ is a comparator, $R_9$ through $R_{12}$ are registers, and $TM_1$ and $TM_2$ are timing pulse generators.

Figure 19:
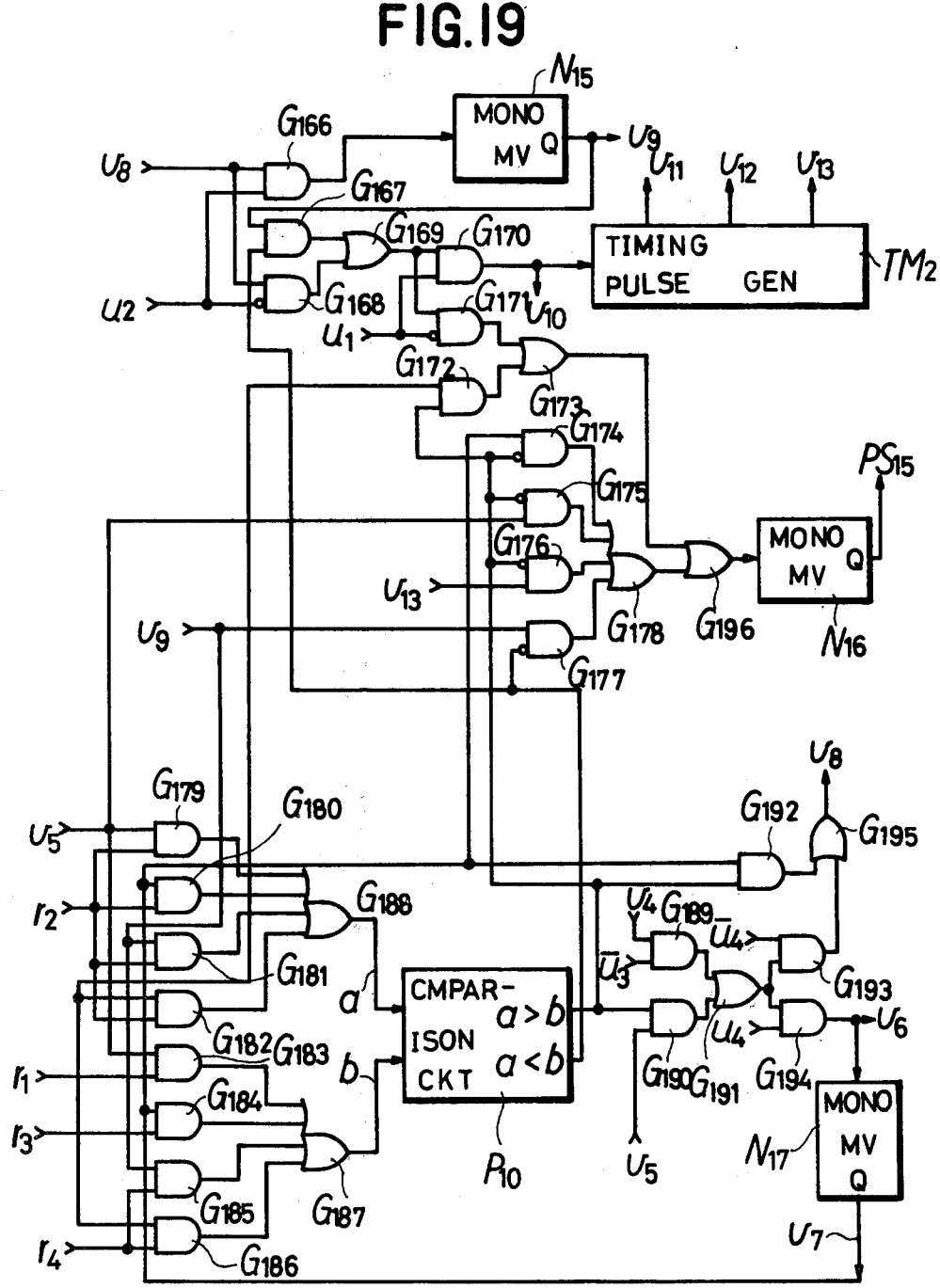

In the construction mentioned above, and explanation is given below on the same concrete example as the operation which has been explained in connection with FIG. 17. As already mentioned, the domain of the number of the row and the column of the matrix [3, 12] shown in FIG. 3 requires interpolation and the output $U_4$ of the interpolation detecting circuit is "1". Further, at the time of detection of the said domain, the output F of the counter $C_3$ shown in FIG. 11 is "2" and the output H of the counter $C_4$ is "0". The row magnification S is "2" and the column magnification T is "3". The output So produced from the gate circuit $G_{18}$ shown in FIG. 9 causes timing pulses to be generated successively at the outputs $V_1$ through $V_4$ of the timing pulse generator $TM_1$ shown in FIG. 18. Upon generation of pulse at the output $V_1$, the row magnification $S=2$ is fed to one input of the multiplier $AC_4$ through the gate circuits $G_{138}$ and $G_{144}$, and the gate circit $G_{143}$ is opened by the said pulse, whereby the output $F=2$ of the counter $C_3$ is fed to the other input of the multiplier $AC_4$. Consequently, a multiplication of "2" by "2" is done in the multiplier $AC_4$ to produce "4" at the output, and this "4" is written in the register $R_9$ by the above-mentioned pulse. Next, upon generation of pulse from the output $V_2$ of the timing pulse generator $TM_1$, the gate circuit $G_{139}$ is opened and the column magnification $T=3$ is fed to one input of the multiplier $AC_4$, and also the gate circuit $G_{146}$ is opened and the output $H=0$ of the counter $C_4$ is fed to the other input of the multiplier $AC_4$. Consequently, "0" is produced at the output of the multiplier $AC_4$ and it is written in the register $R_{10}$ by the pulse of the output $V_2$ through the gate circuit $G_{148}$ which is opened by the said pulse. Further, by the pulse from the output $V_3$ of the timing pulse generator $TM_1$, the gate circuits $G_{140}$ and $G_{141}$ are opened and the row magnification "2" and the column magnification "3" are fed to the multiplier $AC_4$ to produce "6" at the output, which is written in the register $R_{11}$ by the pulse from the output $V_3$. Further, upon generation of pulse from the output $V_4$ of the timing pulse generator $TM_1$, the gate circuit $G_{150}$ is opened, but its output is "0" since the output $U_3$ of the interpolation detecting circuit is "0", and consequently the output of the gate circuit $G_{157}$ also becomes "0". As a result, "0" is written in the register $R_{12}$ by the pulse of output $V_4$. On the other hand, the gate circuit $G_{189}$ shown in FIG. 19 is opened by the pulse of the output $V_4$ and a logical inversion value $\overline{U_3}$ = "1" of the output $U_3 = 0$ of the interpolation detecting circuit opens the gate circuits $G_{193}$ and $G_{194}$ through the gate circuit $G_{191}$. With the output $U_4$ = 1 of the interpolation detecting circuit, a pulse is generated at the output $V_6$ of the gate circuit $G_{194}$, whereby Mono Multi $N_{17}$ is triggered to produce a pulse of the output $V_7$. First the gate circuits $G_{154}$ and $G_{158}$ are opened by the pulse of the output $V_6$ and the output "0" stored in the register $R_{10}$ and the column magnification $T = 3$ are added together by the adder $B_5$ to produce an output "3", which is written in the register $R_{12}$ by the pulse of the output $V_6$. Next, the gate circuits $G_{180}$ and $G_{184}$ are opened by the pulse of the output $V_7$ of Mono Multi $N_{17}$ shown in FIG. 19 and in one input 'a' of the comparator $P_{10}$ is fed "3", while in the other input 'b' is fed "4" which has been stored in the register $R_9$. Therefore the input relationship becomes $a > b$ and "1" is produced at the output $a > b$ of the comparator $P_{10}$. Since the output $a > b$ is "0", the gate circuits $G_{174}$ through $G_{176}$ are opened. To the gate circuit $G_{174}$ is fed an output $V_7$ and so the gate circuit $G_{178}$ produces an output, which triggers Mono Multi $N_{16}$ through the gate circuit $G_{196}$ to produce an output pulse $PS_{15}$. Subsequent operations are completely the same as those which have been explained in connection with the preceding example.

Next, a study is made below on the domain of the number of the row and the column of the matrix [4, 12] shown in FIG. 3. The output $U_4$ of the interpolation detecting circuit is "1", the output F of the counter $C_3$ is "2" and the output H of the counter $C_4$ is "1". Production of the output So shown in FIG. 9 is followed by issuance of timing pulses successively as the outputs $V_1$, $V_2$, $V_3$ and $V_4$ of the timing pulse generator $TM_1$, and multiplication is done successively by the multiplier $AC_4$ in the same manner as hereinbefore described and in the registers $R_9$, $R_{10}$ and $R_{11}$ are stored "4", "3" and "6" respectively. Next, upon generation of a pulse from the output $V_4$ of the timing pulse generator, a pulse of the output $V_6$ is produced from the gate circuit $G_{194}$ through the gate circuits $G_{189}$ and $G_{191}$ shown in FIG. 19 and a pulse of the output $V_7$ produced from Mono Multi $N_{17}$. With the pulse of the output $V_6$ produced, the gate circuits $G_{154}$ and $G_{158}$ shown in FIG. 18 are opened, and the output "3" of the register $R_{10}$ and the column magnification $T =$ "3" are added together by the adder $B_5$ to produce an output "6", which is stored in the register $R_{12}$. Next, with the pulse of the output $V_7$ produced, the gate circuits $G_{180}$ and $G_{184}$ shown in FIG. 19 are opened and to the inputs 'a' and 'b' of the comparator $P_{10}$ are fed "6" and "4" respectively, which gives an input relationship of $a > b$ and causes "1" to be produced at the output $a > b$ of the comparator $P_{10}$. Consequently, an output $V_8$ is produced from the gate circuit $G_{195}$ through the gate circuit $G_{192}$ which is kept open by the pulse of the output $V_7$. The pulse of the output $V_8$ causes an output to be produced from the gate circuit $G_{168}$ and consequently outputs produced from the gate circuits $G_{169}$, $G_{171}$ and $G_{173}$. The output of the gate circuit $G_{173}$ triggers Mono Multi $N_{16}$ through the gate circuit $G_{196}$ to produce an output $PS_{15}$. Subsequent operations are the same as those which have previously been explained.

In the manner mentioned above, dots and interpolation dots are formed. When the dots of the 15th column shown in FIG. 3 have been formed, the counter $C_6$ shown in FIG. 13 counts "5" and coincidence thereof with "5" on the preset counter $C_7$ causes an output to be produced from the coincidence circuit $P_3$ and the output is fed to the gate circuit $G_{71}$. Since the gate circuit $G_{71}$ is kept open by the output of Mono Multi $N_8$ which has been triggered by the circuit $G_{71}$ and resets the counter $C_6$ and further it becomes a signal for moving the wire head to a predetermined position so as to provide spacing for a character to be printed next. This technique is commonly used in ordinary wire dot printers and other head driving type printers and so its details are omitted here.

After a part of a character has been formed, a predetermined space is taken and a portion corresponding to 5 × 7 dots of the following letter, numeral or symbol is formed. In this way, when recording by a single scanning of the head has been completed, the paper is carried ahead to effect line feed.

An explanation is given below on the case where the latter half dots in the dot pattern of FIG. 3 are to be formed. Upon completion of dot recording by a single scanning as mentioned above, a carriage return signal is produced from the side of the wire driving device DR by a conventional means as is shown in FIG. 17 and the wire head returns to the recording start position. These operations are commonly performed in ordinary wire dot printers and other devices of this sort, and the present invention is not characterized in this point; therefore, details are omitted here.

During the period between the issuance of the foregoing carriage return signal and the return of the wire head to the recording start position, the following preparations are made. When printing by a single head scanning has been completed, that is, after the dots of the last column of the last character have been formed, preparations for the following operation are made by an output $PS_{17}$ which is produced from the gate circuit $G_{71}$ shown in FIG. 13. When printing corresponding to a single scanning has been completed, the counter $C_4$ shown in FIG. 11 counts "1" and the counter $C_8$ shown in FIG. 14 stores the number of longitudinal shifts of the registers $M_1$ through $M_9$. Therefore, it is necessary to transcribe these contents to latch circuits. First, an explanation is given below on the operation for transcribing the content of counter $C_4$. The aforementioned output $PS_{17}$ causes an output to be produced from the gate circuit $G_{89}$ shown in FIG. 15 to trigger Mono Multi $N_{10}$ and by the resulting output $PS_{18}$ the value "1" on the counter $C_4$ shown in FIG. 11 is written in the storage latch $R_6$.

Transcription of the counter $C_8$ shown in FIG. 14 is made in the following manner. The gate circuits $G_{79}$ through $G_{82}$ shown in FIG. 15 are opened to allow the storage output from the register $R_8$ to go to outputs $K_1$ through $K_4$ through the gate circuits $G_{79}$ to $G_{82}$ inclusive and the outputs $K_1$ through $K_4$ are fed to one inputs of the arithmetic unit AD shown in FIG. 10. The content of the storage latch $R_8$ is kept "0" while the dots of the initial seven rows of a character are formed; consequently, to the foregoing one inputs of the arithmetic unit AD are fed (0 0 0 0). Further, the above-mentioned output $PS_{18}$ opens the gate circuits $G_9$ through $G_{12}$ shown in FIG. 10 to allow the counting output "3" of the counter $C_8$ shown in FIG. 14 to be fed to the other inputs of the arithmetic unit AD. Consequently, "3" is produced at the output of the arithmetic unit AD and it is written in the storage latch register $R_8$ shown in FIG. 15 by the fall of the foregoing output $PS_{18}$ and thus the content of the counter $C_8$ shown in FIG. 14 is held. That the content of the counter $C_8$ is not directly transcribed to the register $R_8$ is for the following reason. In case recording of a character is completed only by twice scannings of wire head as in the present example, there is no problem. In the case of several scannings, however, it is necessary that, on the basis of how many times up to the last time the storage contents of the registers $M_1$ through $M_9$ have been shifted in a longitudinal direction, it should be known at the time of the following scanning from which row of the bit pattern in the same character of last time which has newly been written from the character generator CG recording must be made; consequently, the newly written bit pattern must be longitudinally shifted by the corresponding number of times.

Upon arrival of the wire head at the start position, the carriage return signal ES shown in FIG. 17 is fed from the wire driving device DR to the counter $C_5$ through the gate circuit $G_{65}$, Mono Multi $N_3$ and gate circuit $G_{66}$ which are shown in FIG. 12, which causes lateral shift pulses of the registers $M_1$ through $M_9$ to be produced successively at the output of the counter $C_5$, so that the bit pattern corresponding to the dot and non-dot of each domain is again transcribed from the character generator CG to the registers $M_1$ through $M_9$. The operation at this time is completely the same as that which has been explained in connection with the first operation. Now, the bit pattern stored in the registers $M_1$ through $M_9$ corresponds to the dot pattern up to the 7th row in FIG. 3. Therefore, in order to form the dots from the 8th to 14th rows, the storage contents of the registers $M_1$ through $M_9$ are shifted three times in a longitudinal direction, then the content in the storage position of register $M_3$ becomes a bit "1" which corresponds to the dot of the number of the row and the column of the matrix [4, 1] in FIG. 2. Then, by the last output of the counter $C_5$ shown in FIG. 12, part of the dot pattern corresponding to the 1st, 2nd and 3rd columns of the dot pattern of FIG. 2 is written in the registers $M_3$ through $M_9$. Thereafter, the output $PS_4$ of Mono Multi $N_5$ which has been triggered by the terminal $d_5$ of the counter $C_5$ sets the flip-flop circuit $F_2$ shown in FIG. 14, the output of which opens the gate circuit $G_{74}$ to allow pulses to be produced from the clock pulse generator CL and fed to the counter $C_8$ through the gate circuit $G_{76}$ and further the gate circuit $G_{77}$, and at the same time the registers $M_1$ through $M_9$ are longitudinally shifted. When three pulses have been counted by the counter $C_8$, the content "3" of the storage latch $R_8$ is fed to the coincidence circuit $P_5$ through the gate circuits $G_{83}$ through $G_{86}$ shown in FIG. 15. The resulting output $PS_{19}$ resets the flip-flop circuit $F_2$ shown in FIG. 14.

Accordingly, by the aforementioned three pulses through the gate circuit $G_{77}$, the contents of the registers $M_1$ through $M_9$ have been shifted three times in a longitudinal direction. Further, the content of the storage latch $R_6$ is set to the counter $C_4$ by the output $PS_{19}$.

Figures 23, 24:
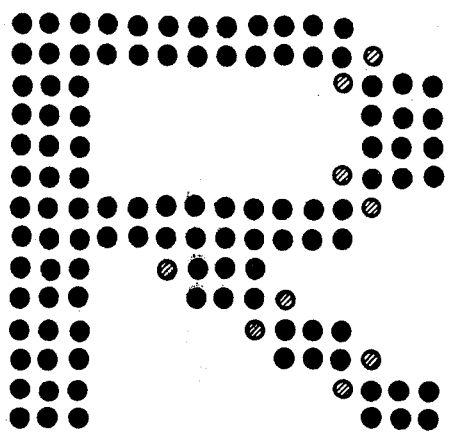
FIG. 23 is an enlarged dot view of the letter "R" formed according to an embodiment of the invention.
FIG. 24 is a table showing an example of interpolation methods using bit pattern.

In the subsequent operations, printing is made in the same manner as initially stated and the dots of the 8th and the following rows of FIG. 3 are formed, and thus there is formed a clear letter "R" which has been subjected to interpolation with hatching as is shown in FIG. 23.

In the above-mentioned example, the number of wires was seven and the row magnification of a character was "2". In case the magnification is integer multiples of the number of wires such as 1, 7, 14 and 21, printing is made in the following manner; that is, after the wire head had completed the scanning for magnified bits corresponding to one bit in the original pattern and when it has shifted to the following scanning, printing is made from the first of the magnified bits of the bits of the following row in the original pattern. An explanation on this operation is given below.

In the case of the row magnification being "14", the counters $C_4$ and $C_3$ shown in FIG. 11 must be changed to tetradecimal counters. Assuming that by twice scannings of the wire head, recording corresponding to 14 dots has been made and thus magnification of one dot in the original pattern has been completed, the counter $C_4$ now counts "0" and the counter $C_3$ also counts "0". Since the decoder DC shown in FIG. 15 is so designed as to produce an output when magnification is 1, 7, 14, 21, ..., the gate circuit $G_{90}$ shown in FIG. 15 is kept open. Therefore, when the output of the comparison circuit $P_2$ shown in FIG. 11 becomes $P = Q$, an output is produced from the gate circuit $G_{90}$ and causes the gate circuit $G_{88}$ to be opened. On the other hand, a signal which indicates the last character for a single scanning is programmed in data in advance, so that, after the output of the last character has been produced, the indication signal DC triggers Mono Multi $N_9$ through the gate circuit $G_{88}$ to produce an output $PS_{20}$. The output $PS_{20}$ resets the counter $C_4$ through the gate circuit $G_{52}$ shown in FIG. 11 and also adds "1" to the counter $C_8$ shown in FIG. 14. Subsequent operations are the same as those previously explained.

The monostable multivibrators have been used in the foregoing example, but this is for clearly showing the relationship between outputs. Provision of such a circuit does not constitute an essential condition of the present invention; in practice, a timing pulse may be produced on the basis of the reference clock pulse.

In the present example, explanations were made on the case of wire dot printers, but the present invention is not limited thereto; that is, the present invention may also be applied to the case of electronic printers such as electrosensitive printers. What is important is that characters such as letters, numerals and symbols are recorded in the form of a dot matrix. Further, the number of dot-forming wires in the foregoing example was seven, but this constitutes no limitation and a suitable number of such wires may be used provided, of course, that a change in the number of such wires is accompanied by a partial change of the construction in the present example. The row and column magnification in the present example were set to two and three respectively; therefore, as shown in FIG. 23, the number of interpolation dot was one in each made of interpolation. However, increase in magnification is accompanied by an increase in the number of dots for interpolation. This is exemplified by FIG. 20, in which interpolation dots have been shown with a bit pattern of "1" and "0" under the condition of row magnification $S = 2$ and column magnification $T = 3$ and the mode shown in FIG. 7B being taken. In FIG. 20, "1" indicates an interpolation dot and "0" indicates an undotted portion.

In the present example, for determining the number of dots for interpolation, dots were experimentally formed and for those giving a high character clearaness, empirical formulae were obtained. However, with respect to the number and position of dots formed, not only in the present example but also in other examples, various cases are considered according to the way of recognizing the character concerned. In the present example, an interpolation dot was included in one range out of two ranges defined by a diagonal line. For example, however, even if an interpolation dot is formed so that it is included also in the other range beyond the diagonal line, the clearness of the character concerned will not greatly lower. In order to form dots in such a manner, the corresponding formulae are prepared and in accordance with these formulae an operational circuit is made, then, in place of the outputs of the operational circuit which are fed to the gate circuits $G_{131}$ through $G_{134}$ shown in FIG. 17, the outputs of the operational circuit based on the newly prepared formulae are fed to the gate circuits $G_{131}$ through $G_{134}$.

In another example, the number and position of interpolation dots formed as well as the magnification of a character are programmed in a memory and, with these and also with the outputs $U_1$ through $U_4$ of the interpolation detecting circuit U, dots may be formed in the interpolation ranges according to the program.

The point is that the number and position of dots to be formed in the range requiring interpolation may be suitably set as necessary.

As set forth hereinbefore, the present invention forms a dot character such as a dot letter, numeral or symbol which has been enlarged with suitable magnifications in both row and column directions, whereby there can be obtained various shapes of enlarged dot characters having suitable widths in both row and column directions. Furthermore, application of the interpolation methods of the present invention keeps the clearness of the figure of the interpolated characters; that is, even if a character is magnified to a suitable size, the clearness of the character will never be lost.

What we claim is:

1. An apparatus for expanding an original character formed by a matrix of display components and non-display components comprising;
    first means for storing a bit pattern in which the display components and the non-display components forming an original character are converted into bits of the first logical value and bits of the second logical value respectively;
    second means for selecting the respective bits which constitute the aforementioned bit pattern in accordance with a predetermined order;
    first storage means for storing the number of row magnification of the original character;
    second storage means for storing the number of column magnification of the original character independently of said first storage means whereby said number of column magnification may be arbitrarily different from said number of row magnification;
    third means for converting the respective bits selected by said second means into a bit matrix in which the number of bits arranged in the respective rows coincides with said number of row magnification stored in said first storage means and the number of bits arranged in the respective columns coincides with that said number of column magnification independently stored in said second storage means, and
    fourth means for forming dots in accordance with the output of said third means and thereby forming a magnified character.

2. An apparatus for expanding an original character formed by a matrix of display components and non-display components as set forth in claim 1, wherein the fourth means comprises:
    a shift register for storing in order a predetermined number of bits arranged in the respective columns of the bit matrix of said third means, and
    dot forming means for forming dots in accordance with the output of said shift register.

3. An apparatus for expanding an original character formed by a matrix of display components and non-display components as set forth in claim 2, wherein the third means comprises:
    first counter means for counting the number of bits arranged in the respective columns of the bit matrix;
    second counter means for counting the number of bits arranged in the respective rows of the bit matrix;
    comparison circuit means for detecting whether or not the output of said first counter means coincides with the output of said second storage means and whether or not the output of said second counter means coincides with the output of said first storage means.

4. An apparatus for expanding an original character formed by a matrix of display components and non-display components comprising:
    first means for storing a bit pattern in which the display components and the non-display components forming an original character are converted into bits of the first logical value and bits of the second logical value respectively;
    second means for selecting the respective bits which constitute the aforementioned bit pattern in accordance with a predetermined order;
    first storage means for storing the number of row magnification of the original character;
    second storage means for storing the number of column magnification of the original character independently of said first storage means whereby said number of column magnification may be arbitrarily different from said number of row magnification;
    third means for detecting whether or not the array of both a bit of the second logical value selected from the aforementioned bit pattern and the surrounding bits thereof coincides with a predetermined rule and, if it coincides, converting the bit into a bit of the first logical value;
    fourth means for converting each bit which has made the respective bits selected by the second means pass through the third means into a bit matrix in which the number of bits arranged in the respective rows coincides with said number of row magnification stored in said first storage means and the number of bits arranged in the respective columns coincides with said number of column magnification independently stored in said second storage means; and
    fifth means for forming dots in accordance with the output of said fourth means and thereby forming a magnified character.

5. An apparatus for expanding an original character formed by a matrix of display components and non-display components as set forth in claim 4, wherein said third means comprises: means for detecting whether or not there is satisfied the condition that in the aforementioned bit pattern two bits of the first logical value are adjoined in an oblique direction and that each of two bits of the second logical value adjoin each of the aforementioned two bits of the first logical value; and means for converting the one of the the said two bits of the second logical value into one bit of the first logical value if the detected condition is satisfied.

6. An apparatus for expanding an original character formed by a matrix of display components and non-display components as set forth in claim 4, wherein said third means comprises:
    means for detecting whether or not there is satisfied the condition that in an arbitrary three bits of the first logical value, the first, second and third bits are formed in an oblique direction, and that the other two bits of the first logical value are formed in a row or column direction such that one bit thereof adjoins the first bit and the other bit thereof adjoins the said one bit, and that the angle between the aforementioned oblique and row or column directions is within 90°; and means for displaying the one bit of the second logical value which adjoins the aforementioned first and second bits if the detected condition is satisfied.

7. An apparatus for expanding an original character formed by a matrix of display components and non-display components as set forth in claim 4, wherein said third means comprises: means for detecting whether or not there is satisfied the condition that in the aforementioned bit pattern two bits of the first logical value are adjoined in an oblique direction and that each of two bits of the second logical value adjoin each of the aforementioned two bits of the first logical value; and means for converting the one of the aforementioned two bits of the second logical value into one bit of the first logical value if the detected condition is satisfied.

8. An apparatus for expanding a character formed by a matrix of display components and non-display components comprising:

first shift register means for storing a bit pattern in which the display components and the non-display components forming an original character are converted into bits of the first logical value and bits of the second logical value respectively and in which the respective stored bits are shifted longitudinally and transversely;

first means for selecting the respective bits which constitute the bit pattern in accordance with a predetermined order from a fixed storage position of said shift register means;

second means for detecting whether or not an array formed by both of a bit of the second logical value selected by the first means and the surrounding bits thereof in the bit pattern coincides with predetermined rules and, if it coincides, for converting the logical value of the bit into the first logical value;

third means for storing the number of row magnification of the original character;

fourth means for storing the number of column magnification of the original character independently of said fourth means whereby said number of columns magnification may be arbitrarily different from said number of row magnification;

fifth means for converting each bit which has made the respective bits selected by the first means pass through the second means into bits of the same number as that of the column magnification stored in said fourth means;

second shift register means for storing bits of a predetermined number from among bits to be converted by said fifth means;

dot forming means for forming dots in order every column in accordance with the output of said second shift register; first counter means for advancing a count every time a bit is stored in said second shaft register;

second counter means for counting the number of columns of dots formed by said dot forming means;

sixth means for resetting said first counter when a counting value of said first counter has coincided with the number stored in said fourth means; and seventh means for resetting the second counter when a counting value of the second counter has coincided with the number stored in said third means.

* * * * *